United States Patent Office 3,387,024
Patented June 4, 1968

3,387,024
CLASS OF ORGANO-PHOSPHOROUS COMPOUNDS AND PROCESS FOR PREPARING MEMBERS THEREOF
Oscar T. Quimby, Cincinnati, Ohio, assignor to The Procter & Gamble Company, Cincinnati, Ohio, a corporation of Ohio
No Drawing. Filed Mar. 30, 1965, Ser. No. 444,030
5 Claims. (Cl. 260—502.4)

ABSTRACT OF THE DISCLOSURE

Cyclic tetraphosphonate compounds having the formula

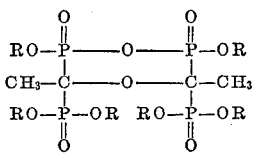

in which R represents hydrogen, sodium, potassium, ammonium, tri(ethanol)ammonium, and lower alkyl radicals containing from 1 to 6 carbon atoms. A process for preparing a cyclic tetraphosphonic acid having the foregoing formula by reacting acetic anhydride with phosphorous acid at a temperature of 135° C.–155° C., for 4 to 13 hours, in the presence of 1–5 weights of a solvent selected from acetic acid, n-propyl sulfone, tetramethylene sulfone, and mixtures thereof per weight of the reactant mixture, the molar ratio of acetic anhydride to phosphorous acid being .5:1 to 1.3:1, and recovering the cyclic tetraphosphonic acid.

---

This invention relates to a new class of compounds and to a process for their preparation.

It has as one of its objects to provide a new class of compounds comprised essentially of a six-membered cyclic tetraphosphonic acid and salts thereof. The members of this class of compounds have valuable sequestering power and detergency building power. Another object of the present invention is to provide a novel process for preparing the cyclic tetraphosphonic acid in high yields and purity. Other objects of the present invention will become apparent from a careful reading of the following description.

The invention is discussed in terms of the cyclic tetraphosphonic acid compound having the composition $C_4H_{12}O_{12}P_4$ as represented by the following structural formula:

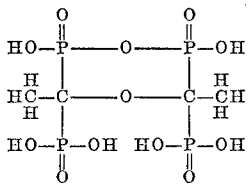

The derivatives of the cyclic acid contemplated by the present invention include salts thereof such as alkali metal salts, as illustrated by sodium and potassium, ammonium and substituted ammonium, and lower alkyl esters of the acid in which the alkyl radical contains from 1 to about 6 carbon atoms, such as methyl, ethyl, propyl, butyl, pentyl, hexyl and the like. The substituted ammonium compounds include alkyl and alkylol substituents having from 1 to 3 carbon atoms, such as for example, methyl, ethyl, propyl, monoethanol and diethanol. In the ether-anhydride structural representation above, it is pointed out that any or all of the hydrogen atoms in the phosphonic moieties can be replaced in preparing the compounds mentioned above and as discussed more fully below. As the acid, the compound has a molecular weight of 376; as the sodium salt, $Na_6$, the molecular weight is 508; and the hexamethyl ester has a molecular weight of 460.

The cyclic tetraphosphonic acid described above can be prepared according to the present invention by a process which in its broadest terms comprises essentially the steps of reacting acetic anhydride with phosphorous acid with stirring at a temperature in the range of from about 120° C. to about 165° C. for a period of from about 1 hour to about 20 hours, the molar ratio of acetic anhydride to phosphorous acid being in the ratio of from about .5:1 to about 1.3:1, respectively, and thereafter recovering the cyclic tetraphosphonic acid from the reaction solution.

The initial reaction between acetic anhydride and phosphorous acid results in the formation of mixed anhydrides and acetic acid; one such reaction is illustrated in the equation below

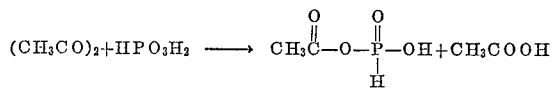

There can also be formed during the above reaction a diacetylated phosphite such as

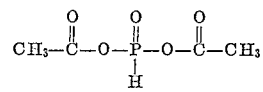

It is these acetylated phosphite compounds which subsequently rearrange during the reaction to form the cyclic tetraphosphonic acid or, in other words, the heat causes the phosphorous-hydrogen compounds to rearrange to phosphorous-carbon compounds.

A preferred molar proportion of the acetic anhydride reactant and the phosphorous acid reactant, respectively, is from .8:1 to 1.05:1. A preferred temperature range for the reaction is from 135° C. to 155° C. A preferred time period for running the reaction is from 4 to 13 hours.

During the course of the reaction, it is observed that a cloudy solution forms first and then a white solid begins to precipitate. This precipitate actually is the desired cyclic tetraphosphonic acid reaction product. Although not anticipatable before proof was obtained, it is the insolubility of the cyclic tetraphosphonic acid in the acid reaction solution which is a critical factor in driving the reaction to completion. As an inducement to the early precipitation of the cyclic tetraphosphonic acid, it is important during the early stages of the reaction to avoid a large excess of active acetyl groups in the reaction solution. High completeness, however, does require that more active acetyl groups be added later as the reaction advances. This is especially so if it is desired to provide virtually quantitative conversion of the phosphorus in the starting reagent to the cyclic tetraphosphonic acid.

Based on these considerations and observations, a preferred embodiment of the present invention comprises conducting the reaction in two stages. This preferred embodiment calls for heating a reaction solution comprising essentially one mole of phosphorous acid and from about 40 mole percent to about 50 mole percent of acetic anhydride while stirring to a temperature in the range of from about 120° C. to about 165° C. until a substantial amount of precipitate has formed, then adding to the reaction mixture an additional amount of acetic anhydride, making a total molar proportion of acetic anhydride to phosphorous acid in the range of from about .5:1 to about 1.3:1, and preferably from .8:1 to 1.05:1, respectively, the reaction lasting for a period of from 1 hour to about 20 hours.

The following three equations demonstrate how the starting reactions react to form the cyclic tetraphosphonic acid when used in a theoretical 1:1 ratio. The equations also show some of the intermediates through which the reaction proceeds.

(A)
$(CH_3CO)_2O + 2HPO_3H_2 \longrightarrow CH_3C(OH)(PO_3H_2)_2 + CH_3COOH$ (B)
$2CH_3C(OH)(PO_3H_2)_2 + 2(CH_3CO)_2O \longrightarrow$

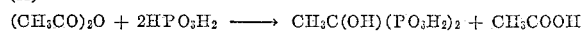

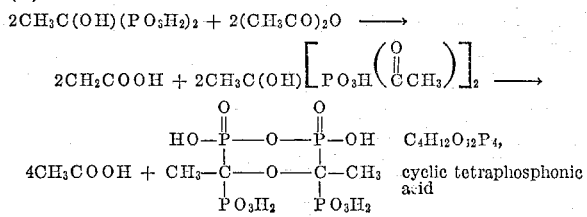

Overall result:

(C)
$4(CH_4CO)_2O + 4HPO_3H_2 \longrightarrow$
cyclic tetraphosphonic acid $6CH_3COOH$ These equations also show some of the intermediates through which the reaction proceeds.

When more than 1.0 mole of acetic anhydride is used per mole of phosphorous acid, there will be some acetyl groups replacing hydrogens or phosphonate groups as illustrated by the following equation.

(D)
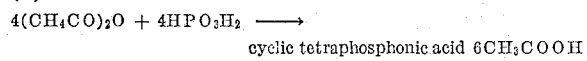

(I)

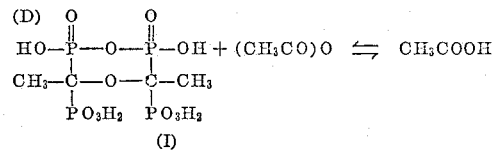

(II)

Regardless of the number of hydrogens replaced by any excess acetyls, the product of reactions such as (D) above are less likely to precipitate initially. Furthermore, to the extent that such acetylated cyclic tetraphosphonic acid compounds such as (II) are present, they reduce the concentration of the free cyclic tetraphosphonic acid (I), thus interfering with nucleation. When crystals of the desired cyclic acid are already present as shown by the presence of a white precipitate, the extra acetic anhydride should be added; with continued heating and stirring crystallization then continues until substantially all of the phosphorus is crystallized as the desired acid (I).

It has also been discovered that it is preferred to conduct the reaction in the presence of a solvent such as acetic acid, sulfones, e.g., n-propyl sulfone, tetramethylene sulfone, mixtures thereof, and the like. When mixtures are used they can be composed of any proportions. The solvent dissolves the initial reactants, partially dissolves the intermediates, and reduces the viscosity of the reaction mixture. It facilitates effective stirring of the multi-phase mixture. In order to speed up the reaction, the reaction mixture should be agitated or stirred by any suitable means. The presence of a solvent also facilitates separation of the solid reaction product in pure form from the reaction mixture.

The acetic which is mentioned just above as a solvent could be in excess of that which is formed by the reaction between the acetic anhydride and phosphorous acid, as shown in the equations above.

When a solvent is used, it should be used at levels of from about 1 to about 5 weights of solvent per each weight of the reactant mixture.

The solid cyclic tetraphosphonic acid can be separated from the reaction solution and recovered in pure form by several methods. For example, filtration followed by washing with an organic solvent (e.g., a hydrocarbon, a halocarbon, or an ether, and the like) yields a solid of high purity, provided it is not allowed to absorb moisture from the atmosphere while the residual organic solvent is evaporating. A preferred method consists of filtering off the solid, washing said solid twice with chloroform or with ethyl ether to remove adhering mother liquor, and drying the washed solid in a vacuum chamber.

The following examples illustrate the present invention. From a careful examination of these procedures, especially in the light of the preceding discussion, certain modifications will become apparent. Such modifications fall within the intended scope of the present invention except as the invention is limited by the appended claims.

Example I

To 25 g. of di-n-propyl sulfone (abbreviated hereinafter as $Pr_2SO_2$) was added 16.4 g. (0.20 mol) phosphorous acid and 16.3 g. (0.16 mol) acetic anhydride. The reaction mixture was a homogeneous solution and remained so after 80 minutes of heating and stirring at reflux temperature (136° to 139° C.). It was allowed to stand at room temperature over the weekend and became cloudy. It then contained a small amount of white solid. The mixture was again heated to reflux. After about an hour of such heating, more $Pr_2SO_2$ was added in 5 g. portions over a 20 minute period until the total $Pr_2SO_2$ reached 50 g. This increased the reflux temperature to 153° to 156° C. After a total heating time of 4¼ hours, the mixture was quickly cooled to room temperature and centrifuged; 39 g. of mother liquor was decanted. The solids were washed four times with ethyl ether, centrifuging the solids down each time and decanting off the wash liquor. After drying under a stream of argon, the yield of dried solid was 15 g. or 80% of the amount possible if all of the phosphorous acid was converted to the cyclic tetraphosphonate. Both by phosphorous magnetic resonance and by X-ray diffraction pattern this solid acid was 100% cyclic tetraphosphonic acid. The sulfone mother liquor contained two kinds of P distributed thus: 75% $HPO_3H_2$ + 25% $H_3PO_4$. This solid acid was found to be only slightly soluble in dimethyl sulfoxide, a little more soluble in dimethyl formamide, but readily soluble in water. Many other solvents were tried with no sign by microscopic inspection of any solubility in sulfones, esters, ethers, ketones, halocarbons, carbon disulfide, acetonitrile, acetols, ketals, N-methyl-2-pyrolidone, hexamethylphosphoramide, concentrated sulfuric acid.

A sample of the solid acid was converted to the $Na_6$ salt by neutralization with NaOH. Upon testing as a sequestrant for calcium using a nephelometric method, the sequestering efficiency was about 9 g. co./100 g. $Na_6$ salt over the pH range from 10 to 12 at 25° C.

Example II

Acetic anhydride (449 g. or 4.4 mols) was dissolved in 1600 g. of di-n-propyl sulfone and 451 g. of crystalline phosphorous acid added. After 15 minutes of stirring a homogeneous yellow solution resulted. Upon heating the solution, while it was mechanically stirred, it clouded by the time the temperature reached 130° C., but cleared one hour later by which time refluxing had started (temperature 161° C.). The temperature was decreased to 150° C. and the solution reclouded after 2¾ hours of additional heating at 150° C. The mixture was heated 2.5 hours more at 150° C., then allowed to cool to room temperature, and to stand overnight in a tightly closed system. On the following day the slurry was heated once more to 150° C. and held at that temperature for 6 more hours. Total reaction time was about 13 hours.

The hot slurry was then filtered under a blanket of nitrogen gas and the solid acid was washed twice with $Pr_2SO_2$ thus cooling the solid to room temperature. It was then washed three times more with ethyl ether, still under a nitrogen blanket. The solid acid was dried overnight in a desiccator over $P_2O_5$. The yield of dried solid was 240 g. (43% based on $HPO_3H_2$) having the following elemental analysis:

Theory for $C_4H_{12}O_{12}P_4$: $H_2O$, 0.00%; carbon, 12.78%; hydrogen, 3.22%; phosphorus, 32.95%. Found: $H_2O$, 0.4, 0.6%; carbon, 13.4, 13.6%; hydrogen, 3.7, 3.5%; phosphorus, 33.2%.

By $P^{31}$ MR and X-ray diffraction, the dried solid was wholly the cyclic tetraphosphonic acid; by acid-base titration it corresponded to 98% of the cyclic tetraphosphonic acid. Upon neutralization with NaOH to pH 12 and measuring the calcium sequestering efficiency by nephelometric titration the product gave an efficiency of 8.9 g. ca./100 g. of the $Na_6$ salt of the cyclic tetraphosphonate.

Example III

To 16.3 g. (0.16 mol) acetic anhydride was added 16.4 g. (0.20 mol) of crystalline phosphorous acid and the mixture stirred until a homogeneous solution was formed; then, 6.0 g. (0.10 mol) acetic acid was added. After 2 hours of refluxing (temperature 120 to 125° C.) the solution was still homogeneous. It was then allowed to continue refluxing overnight (total time of refluxing 17½ hours). The mixture had become a white creamy paste which was stirring adequately only right near the magnetic stirring bar. Upon microscopic examination the slurry was found to be a suspension of crystals in a liquid. This slurry showed three phosphorous species in the $P^{31}$ magnetic resonance spectrum with the following distribution:

59 mole percent P as cyclic tetraphosphonate
25 mole percent P as ethane-1-hydroxy-1,1-diphosphonic acid
16 mole percent P as phosphorous acid.

The crystals of the cyclic compound were found to be essentially insoluble when the above slurry was mixed with one of the following organic solvents: s-tetrachloroethane, acetic acid, or di-n-butyl ether.

Example IV

A reaction mixture is prepared containing 16.4 g. (0.20 mole) $HPO_3H_2$ plus 16.3 g. (0.16 mole) $(CH_3CO_2)O$ along with 50 cc. of solvent (tetramethylene sulfone). This is heated to 140° to 150° C. for a period of 2.5 hours, stirring mechanically to insure contact of the phases; a second liquid phase appears very soon after the heating starts; by the end of this period a substantial amount of the cyclic tetraphosphonic acid crystallizes so that the white slurry has a creamy consistency.

At this point the molar ratio of acetic anhydride to phosphorous acid is raised to 1.20:1.00 by introducing an additional 8.15 g. (0.08 mole) $(CH_3CO)_2O$ and the heating and stirring continued for three hours longer. The solid is recovered by filtration and washed twice with ethyl ether. The ether-free solid weighs 17.5 g. (93% yield based on the $HPO_3H_2$ taken).

Example V

Cyclic tetraphosphonic acid (25 g.) prepared according to the present invention was slurried in 320 g. trimethyl orthoformate $HC(OCH_3)_3$ and 400 cc. of methanol was added. The slurry was heated to reflux (64° C.) and held near that temperature for 21 hours. During this time, a substantial portion of the $HC(OCH_3)_3$ and $CH_3OH$ inadvertently escaped from the unattended reaction mixture; a sufficient amount of the reactants remained in the reaction apparatus however, so that no damage was done to the reaction. An additional 150 cc. $HC(OCH_3)_3$ and 400 cc. methanol were added to the reaction mixture to compensate for the reagents that had been lost. On heating the mixture to reflux (65° C.) it became a clear solution. The clear solution was refluxed for an additional 54 hours (75 hours total to this point) with methanol being removed slowly by distillation; the reflux temperature remained at 64 to 67° C. During the following 56 hours, methanol was removed at a slightly faster rate, allowing the temperature to raise gradually from 67° C. to 98° C. At this point the reaction was stopped. On cooling, a portion of the ester product crystallized; hexane was added to the system to encourage further crystallization. The hexamethyl ester of the cyclic tetraphosphonic acid was then recovered from the reaction mixture by filtration; yield 21–25 g. of a solid product.

In place of $HC(OCH_3)_3$ other orthoformates can be used to make other esters of the cyclic tetraphosphonic acid, for example, ethyl, methyl, n-hexyl esters.

As can be seen from the above examples, the cyclic tetraphosphonic acid of the present invention and its salts have characteristic nuclear magnetic resonance involving two broad $P^{31}$ peaks of equal areas, one at a delta of $-16$ to $-14$ p.p.m. and the other at $-11$ to $-5$ p.p.m. and an $H^1$ triplet for $CH_3$—C protons at a tau of 7.9 to 8.0 p.p.m. with $J=14$ to 16 cps. For comparison, the spectrum of ethane-1-hydroxy-1,1-diphosphonic acid involves a single $P^{31}$ peak at delta$=-19$ to $-20$ p.p.m. and an $H^1$ triplet for $CH_3$—C protons at tau$=8.2$ to 8.5 p.p.m. with $J=14$ to 16 cps. Spin decoupling analysis of the hexmethyl ester of the cyclic tetraphosphonic acid has proven unequivocably that the downfield $P^{31}$ peak ($-16$ to $-14$ p.p.m.) belongs to the phosphorus in the $PO_3H_2$ group in the cyclic acid. Another important characteristic of the $P^{31}$ NMR spectrum of the cyclic acid is that the two peaks approach each other as base is added, so that in an aqueous solution of the $K_6$ salt, containing an extra mole of potassium hydroxide, the peaks overlap considerably. In the preceding discussion, the position of the $P^{31}$ peaks is measured relative to 85% $H_3PO_4$ (external standard) as 0.0 p.p.m., and $H^1$ peaks relative to tetramethylsilicane protons as 10.0 p.p.m.

All forms of the cyclic acid compound or salts thereof show a rather low solubility in the great majority of solvents. Even the hexamethyl ester has a low solubility in many organic solvents; the recrystallized ester has an unusually high melting point of about 140–141° C. The washed and dried acid has a melting point of 222.5° C., with some decomposition occurring at that temperature. The free acid and the $Na_6$ salt are insoluble in practically all organic solvents.

In water the acid solubility is moderate at 80° F., i.e., about 16% as compared to about 70% for ethane-1-hydroxy-1,1-diphosphonic acid. The $K_6$ salt is much more soluble in water, 35% solutions having been prepared at 80° F.

It is surprising that the six-membered cyclic electrolyte salts described herein would have such relatively high calcium sequestering power. It has been proven, however, that they are substantially more effective in this regard than sodium tripolyphosphate.

The sodium and potassium salts of the cyclic tetraphosphonic acid are especially valuable as sequestering agents and also as builders in detergent compositions. As a builder compound the sodium and potassium salts of the cyclic tetraphosphonic acid perform as well as sodium tripolyphosphate which is a widely used builder compound. As builders, the compounds of the present invention can be used in admixture with detergent compounds selected from the group consisting of anionic, nonionic, ampholytic, cationic and zwitterionic detergents. Generally, the builders are used in the detergents in weight proportions of detergent to builder of 3:1 to 1:10. In complete detergent formulations containing the aforementioned detergent-builder mixtures there can also be used the usual types of additives such as alkaline materials, silicates, sulphates, germicides, suds builders or suppressors, dyes, perfumes, carboxymethylcellulose and the like.

The members of the new class of compounds described herein can also be used in any other applications where it is desired to complex and sequester metal ions such as calcium, magnesium, iron, etc. Examples of such applications include softening of water and prevention and removal of scale deposits in boilers, oil wells and metal tubing used in connection therewith. Other useful areas of application are described in a book entitled "Organic Sequestering Agents" by Chabarek and Martell, published 1959 by John Wiley and Sons.

The alkali metal salts of the cyclic tetraphosphonic acid can be prepared by neutralizing the acid with a suitable base material such as sodium or potassium hydroxide. The ammonium and substituted ammonium compounds can also readily be prepared similarly by use of a suitable base material such as ammonium hydroxide or triethanolamine.

What is claimed is:

1. Cyclic tetraphosphonate compounds having the formula:

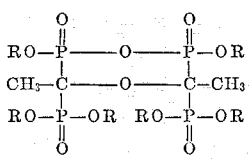

in which R is selected from the group consisting of hydrogen sodium, potassium, ammonium radical, triethanol ammonium radicals, and lower alkyl radicals containing from 1 to 6 carbon atoms.

2. A compound according to claim 1 wherein R is hydrogen.

3. A process for preparing a cyclic tetraphosphonic acid having the following formula:

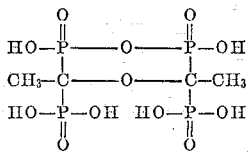

which comprises the steps of reacting acetic anhydride with phosphorous acid with stirring at a temperature in the range of from about 135° C. to about 155° C. for a period of from about 4 hours to about 13 hours, in the presence of from about 1 to about 5 weights of a solvent selected from the group consisting of acetic acid, n-propyl sulfone, tetramethylene sulfone, and mixtures thereof per weight of the reactant mixture, the molar ratio of said acetic anhydride to said phosphorous acid being in the ratio of from about .5:1 to about 1.3:1 and thereafter recovering said cyclic tetraphosphonic acid.

4. A process according to claim 3 wherein the molar proportion of said acetic anhydride to said phosphorous acid is in the range of .8:1 to 1.05:1.

5. A process for preparing a cyclic tetraphosphonic acid having the following formula:

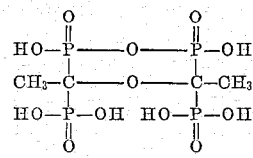

which comprises the steps of heating a reaction solution comprising essentially one mole of phosphorous acid and from about 40 mole percent to about 50 mole percent of acetic anhydride, while stirring, to a temperature in the range of from about 135° C. to about 155° C. until a substantial amount of precipitate has formed, then adding to the reaction solution an additional amount of acetic anhydride making a total molar proportion of acetic anhydride to phosphorous acid in the range of from about .5:1 to about 1.3:1, the reaction lasting for a period of from about 4 hours to about 13 hours.

References Cited

UNITED STATES PATENTS 3,122,417 2/1964 Blaser et al.
3,214,454 10/1965 Blaser et al.

FOREIGN PATENTS 1,148,551 5/1963 Germany.
978,297 12/1964 Great Britain.

BERNARD HELFIN, *Acting Primary Examiner.*

LEON ZITVER, *Examiner.*

JOSEPH E. EVANS, *Assistant Examiner.*